US008447800B2

(12) United States Patent
Dockser et al.

(10) Patent No.: US 8,447,800 B2
(45) Date of Patent: *May 21, 2013

(54) MODE-BASED MULTIPLY-ADD RECODING FOR DENORMAL OPERANDS

(75) Inventors: Kenneth Alan Dockser, Cary, NC (US); Pathik Sunil Lall, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

This patent is subject to a terminal disclaimer.

(21) Appl. No.: 13/026,335

(22) Filed: Feb. 14, 2011

(65) Prior Publication Data

US 2011/0137970 A1    Jun. 9, 2011

Related U.S. Application Data

(63) Continuation of application No. 11/382,525, filed on May 10, 2006, now Pat. No. 7,912,887.

(51) Int. Cl.
*G06F 7/38*      (2006.01)
(52) U.S. Cl.
USPC ......................................... 708/501; 708/523
(58) Field of Classification Search
USPC ................................ 708/501, 523
See application file for complete search history.

(56) References Cited

U.S. PATENT DOCUMENTS

| 4,727,508 A | 2/1988 | Williams |
| 5,880,984 A | 3/1999 | Burchfiel et al. |
| 5,901,301 A | 5/1999 | Matsuo et al. |
| 5,903,479 A * | 5/1999 | Schwarz et al. ............ 708/205 |

(Continued)

FOREIGN PATENT DOCUMENTS

| EP | 0901067 A2 | 3/1999 |
| GB | 2185338 | 7/1987 |
| JP | 2003529124 | 9/2003 |

OTHER PUBLICATIONS

Hu He, Zheng Li, and Yihe Sun; "Multiply-add fused float point unit with on-fly denormalized number processing," 48th Midwest Symposium on Circuits and Systems, vol. 2, pp. 1466-1468, Aug. 2005.*

(Continued)

*Primary Examiner* — Chuong D Ngo
*Assistant Examiner* — Matthew Sandifer
(74) *Attorney, Agent, or Firm* — Nicholas J. Pauley; Peter Michael Kamarchik; Joseph Agusta

(57) ABSTRACT

In a denormal support mode, the normalization circuit of a floating-point adder is used to normalize or denormalized the output of a floating-point multiplier. Each floating-point multiply instruction is speculatively converted to a multiply-add instruction, with the addend forced to zero. This preserves the value of the product, while normalizing or denormalizing the product using the floating-point adder's normalization circuit. When the operands to the multiply operation are available, they are inspected. If the operands will not generate an unnormal intermediate product or a denormal final product, the add operation is suppressed, such as by operand-forwarding. Additionally, each non-fused floating-point multiply-add instruction is replaced with a multiply-add instruction having a zero addend, and a floating-point add instruction having the addend of the original multiply-add instruction is inserted into the instruction stream. Upon inspection of the operands, if an unnormal intermediate result or a denormal final result will not occur, the addend may be restored to the multiply-add instruction and the add instruction converted to a NOP.

2 Claims, 4 Drawing Sheets

U.S. PATENT DOCUMENTS

| | | | |
|---|---|---|---|
| 5,999,960 | A | 12/1999 | Gerwig et al. |
| 6,714,957 | B1 | 3/2004 | Lohman |
| RE38,679 | E * | 12/2004 | Matsuo et al. ............... 712/212 |
| 7,080,111 | B2 * | 7/2006 | Pangal et al. ............... 708/501 |
| 7,225,323 | B2 | 5/2007 | Siu et al. |
| 7,346,643 | B1 | 3/2008 | Ho et al. |
| 2002/0194239 | A1 | 12/2002 | Pangal |
| 2005/0228844 | A1 | 10/2005 | Dhong et al. |
| 2006/0179093 | A1 * | 8/2006 | Powell et al. ............... 708/204 |
| 2007/0061392 | A1 | 3/2007 | Gerwig et al. |
| 2007/0266071 | A1 | 11/2007 | Dockser et al. |
| 2008/0256161 | A1 | 10/2008 | Quinnell et al. |
| 2009/0077152 | A1 * | 3/2009 | Powell et al. ............... 708/501 |

OTHER PUBLICATIONS

International Preliminary Report on Patentability—PCT/US07/067649, The International Bureau of WIPO, Geneva Switzerland—Nov. 11, 2008.

International Search Report—PCT/US07/067649, International Search Authority—European Patent Office—Sep. 21, 2007.

Schwarz, E. et al., "Hardware Implementations of Denormalized Numbers," Proceedings 16th IEEE Symposium on Computer Arithmetic (Arith 16), IEEE Computer Society, ISBN 0-7695-1894-X. Jun. 2003.

Written Opinion—PCT/US07/067649, International Search Authority—European Patent Office—Sep. 21, 2007.

* cited by examiner

MODE-BASED MULTIPLY-ADD RECODING FOR DENORMAL OPERANDS

FIELD

The present disclosure relates generally to the field of processors and in particular to a mode-based method of recoding floating-point multiply instructions to floating-point multiply-add instructions to account for denormal operands.

BACKGROUND

Microprocessors perform computational operations on numerical values in a wide variety of applications. High execution speed, low power consumption and small size are important goals for processor designers, particularly in embedded applications such as portable electronic devices. Modern processors employ a pipelined architecture, where sequential instructions, each having multiple execution steps, are overlapped in execution. In a pipelined architecture, each instruction is executed in a series of execution stages, such as Fetch, Decode, Execute, and Write-Back, each of which may comprise a plurality of pipe stages. A pipe stage consists of a storage element and logic that executes all or part of an instruction execution stage. Instructions flow sequentially through the pipeline. The Execute stage performs the arithmetical, logical, or memory access operation specified by the instruction, and in particular may perform a variety of arithmetical operations on numerical values.

Digital processors represent numerical values in either fixed-point or floating-point format. A floating-point number comprises a fixed-point significand (also known as a mantissa) multiplied by the base 2 raised to an integer exponent. In some formats, such as the IEEE 754 standard, incorporated herein by reference, the floating-point representation additionally includes a sign bit. Multiplying the significand by 2 raised to an integer exponent is the binary analog to scientific notation in the base 10 system. That is, the value of the exponent determines the number of bit positions, and the direction, that the binary point in the significand should be shifted to realize the actual numerical value—hence the term, floating point.

When the significand is in the range 1<=significand<2 and the exponent is within its defined range, the floating-point value is referred to as a "normal" number. The significand of a normal floating-point number is thus of the form 1.fraction, where "fraction" is a binary value representing the fractional portion of the significand greater than one. The value of the exponent effectively shifts the binary point left (for a negative exponent) or right (for a positive exponent). In the IEEE 754 standard, the value of the exponent for a single-precision floating-point number ranges from −126 to 127. When encoding the number in IEEE 754 single-precision format, a bias of 127 is added to the raw exponent so that all encoded exponents are positive.

A floating-point value that is represented with a significand that is less than one, i.e., 0<significand<1, with any exponent, is referred to herein as an "unnormal" number. One subset of unnormal floating-point numbers of particular interest is "denormal" numbers (also known as subnormal numbers). Denormal floating-point numbers represent values smaller than $1.0 \times 2^{-126}$ by utilizing a significand in the range 0<significand<1, and the exponent −126. A denormal floating-point number has a significand of the form 0.fraction, with the number of leading zeros in the fraction ranging from zero to the width of the fraction—1. A denormal number effectively utilizes bit positions in the fractional portion of a normal significand to achieve a "left shift" of the binary point in excess of 126 bit positions—at the cost of loss of precision, as fewer bits remain to accurately represent the numerical value. Denormal numbers represent values very close to zero, and may be used to implement gradual underflow, allowing a calculation to lose precision slowly when the result is very small.

In the case of a floating-point multiplier circuit, denormal products may arise in several ways. Either the multiplier or the multiplicand may be a denormal number. In this case the significand of the intermediate product will commonly be unnormal (i.e., less than one) while the final rounded product may be a normal or denormal number, depending on the numerical values of the operands. If both the multiplier and the multiplicand are denormal numbers, the final rounded product will be zero or the smallest representable denormal number.

Additionally, the product of two normal numbers may be a denormal number if the exponents are small and would yield a normalized number requiring an exponent less than −126 (for single-precision). Note that this case is distinct from the common situation in which an intermediate value of the multiplication assumes a "non-normal" form. A normal significand may assume any value in the range [1,2)—that is, from exactly one to almost two (1.0000 to 1.1111, for a hypothetical 5-bit significand). The product of two normal significands may assume a value in the range [1,4)—that is, from exactly one to almost four. This intermediate product significand thus may assume the form 1.fraction or 1x.fraction, the latter for values from two to almost four (10.0000 to 11.1111). Floating-point multipliers adjust this intermediate result by shifting the binary point left and incrementing the exponent by one, as a routine incident of floating-point multiplication. Such a "non-normal" intermediate result is not herein considered a denormal number, and is not explicitly addressed by the present disclosure.

In common processor applications, such as some embedded processors, denormal numbers need not always be supported. For example, denormal values may simply be represented as zero without significant loss of accuracy. However, the Java® programming language specifies support for denormal numbers. Accordingly, processors that support direct execution of Java code to accommodate denormal floating-point numbers, at least during a Java execution mode.

Denormal floating-point numbers may be supported in software by generating an exception upon detecting a denormal number, and processing the denormal number in a software routine. This process is slow and incurs a large degree of overhead, which reduces system performance and increases power consumption.

Denormal numbers may be supported in hardware by adding denormal detection and normalization circuits to each floating-point computational element. For example, denormal numbers may be "normalized" by shifting the significand to a normal position (i.e., 1.fraction), and allowing a (non-standard) value of the exponent smaller than −126 (for the single-precision case). Likewise, the results may be "denormalized" by shifting the significand to a denormal position (i.e., 0.fraction) so that the exponent becomes −126 (for the single precision case). However, such additional circuits increase silicon area, increase latency, and introduce throughput delay, potentially increasing the minimum cycle time and hence reducing the maximum operating frequency. Additionally, denormal numbers are rarely encountered, and optimizing performance for the rare case at the expense of the common case reduces overall processor performance.

SUMMARY

Floating-point adders include circuits to align addends, and to normalize and round the sum. According to one or more embodiments, in a denormal support mode the normalization circuit of a floating-point adder is utilized to normalize or denormalize results from a floating-point multiplier. Each multiply instruction is speculatively replaced with a multiply-add (also known as multiply-accumulate) instruction with the addend forced to zero. This directs the multiplier output through the adder circuit without altering its value, but utilizing the normalization circuit of the adder to normalize or denormalize the product. If it is determined that neither the intermediate product will be unnormal nor the final product will be a denormal number, the add portion of the operation may be suppressed, such as by operand forwarding. Often this determination can be made early in the multiply execution by operating on the exponents of the multiply instruction operands.

One embodiment relates to a method of executing a floating-point multiply instruction to account for an unnormal intermediate significand or a denormal final product. The floating-point multiply instruction is converted to a floating-point multiply-add instruction operative to perform a floating-point multiply operation and a floating-point add operation, and one addend of the floating-point add operation is forced to zero.

Another embodiment relates to a processor. The processor includes one or more instruction execution pipelines, including a floating-point multiply-accumulate unit, having a normalization circuit. The processor additionally includes a pipeline controller operative to normalize or denormalize an unnormal intermediate significand or a denormal floating-point product output by the floating-point multiplier using the normalization circuit of the floating-point adder.

DETAILED DESCRIPTION

Figure 1:
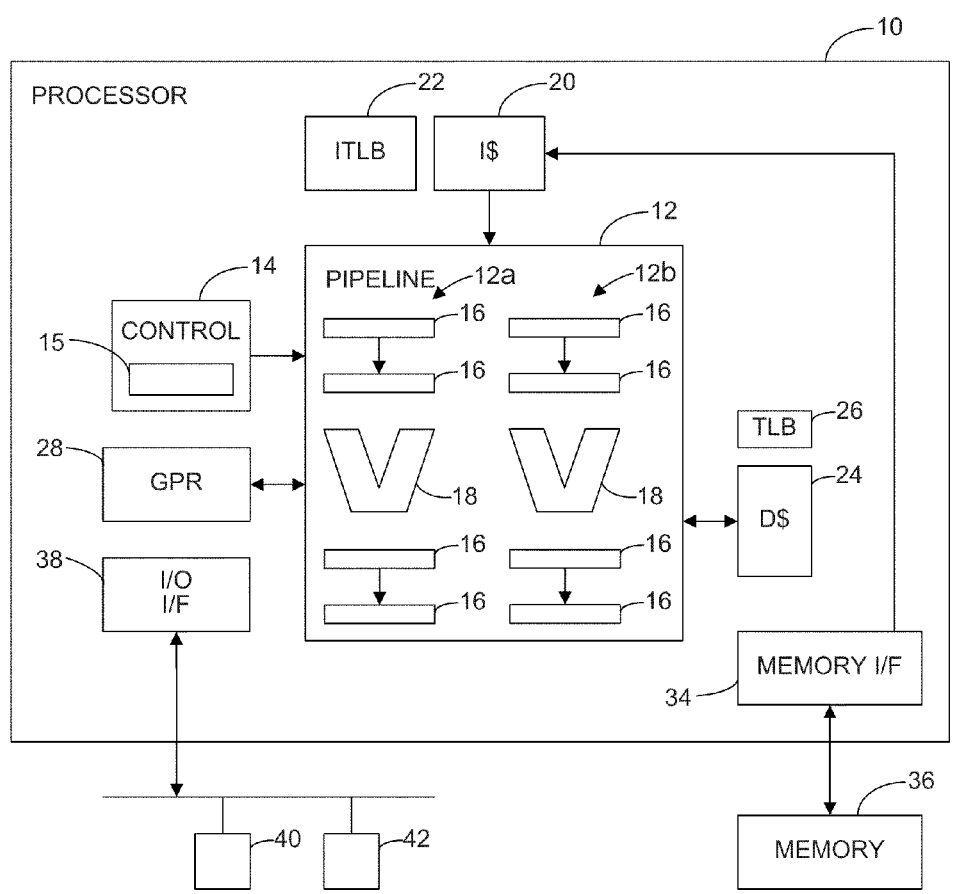
FIG. 1 is a functional block diagram of a processor.

FIG. 1 depicts a functional block diagram of a processor 10. The processor 10 executes instructions in an instruction execution pipeline 12 according to control logic 14. The control logic 14 includes one or more registers, such as status register 15, which define various operating modes. The pipeline 12 may be a superscalar design, with multiple parallel pipelines such as 12a and 12b. Each pipeline 12a, 12b includes various registers or latches 16, organized in pipe stages, and one or more Arithmetic Logic Units (ALU) 18. Pipe stage registers or latches 16 and ALUs 18 may read operands from and/or write results to registers in a General Purpose Register file 28.

The pipelines 12a, 12b fetch instructions from an Instruction Cache (I-Cache or I$) 20, with memory addressing and permissions managed by an Instruction-side Translation Lookaside Buffer (ITLB) 22. Data is accessed from a Data Cache (D-Cache or D$) 24, with memory addressing and permissions managed by a main Translation Lookaside Buffer (TLB) 26. In various embodiments, the ITLB 22 may comprise a copy of a portion of the TLB 26. Alternatively, the ITLB 22 and TLB 26 may be integrated. Similarly, in various embodiments of the processor 10, the I-cache 20 and D-cache 24 may be integrated, or unified. Misses in the I-cache 20 and/or the D-cache 24 cause an access to main (off-chip) memory 36, under the control of a memory interface 34.

The processor 10 may include an Input/Output (I/O) interface 38, controlling access to various peripheral devices 40, 42. Those of skill in the art will recognize that numerous variations of the processor 10 are possible. For example, the processor 10 may include a second-level (L2) cache for either or both the I and D caches. In addition, one or more of the functional blocks depicted in the processor 10 may be omitted from a particular embodiment.

In one or more embodiments, the processor 10 operates in a denormal support mode, which may, for example, be indicated by a denormal support bit in the status register 15. In particular, the denormal support mode may be entered whenever the processor 10 directly executes Java code, and at other such times as programmers elect to support denormal floating-point numbers.

In denormal support mode, the processor 10 speculatively converts each floating-point multiply instruction to a multiply-add (or multiply-accumulate) instruction, with an addend of zero. A multiply-add operation may be of the fused or non-fused type. In a fused multiply-add operation, the full width of the intermediate product (twice the width of the input) is passed to the adder without an intermediate rounding. In a non-fused multiply-add operation, the intermediate product of the multiply operation is rounded (often to the input precision) prior to the add operation being performed.

Figure 2:
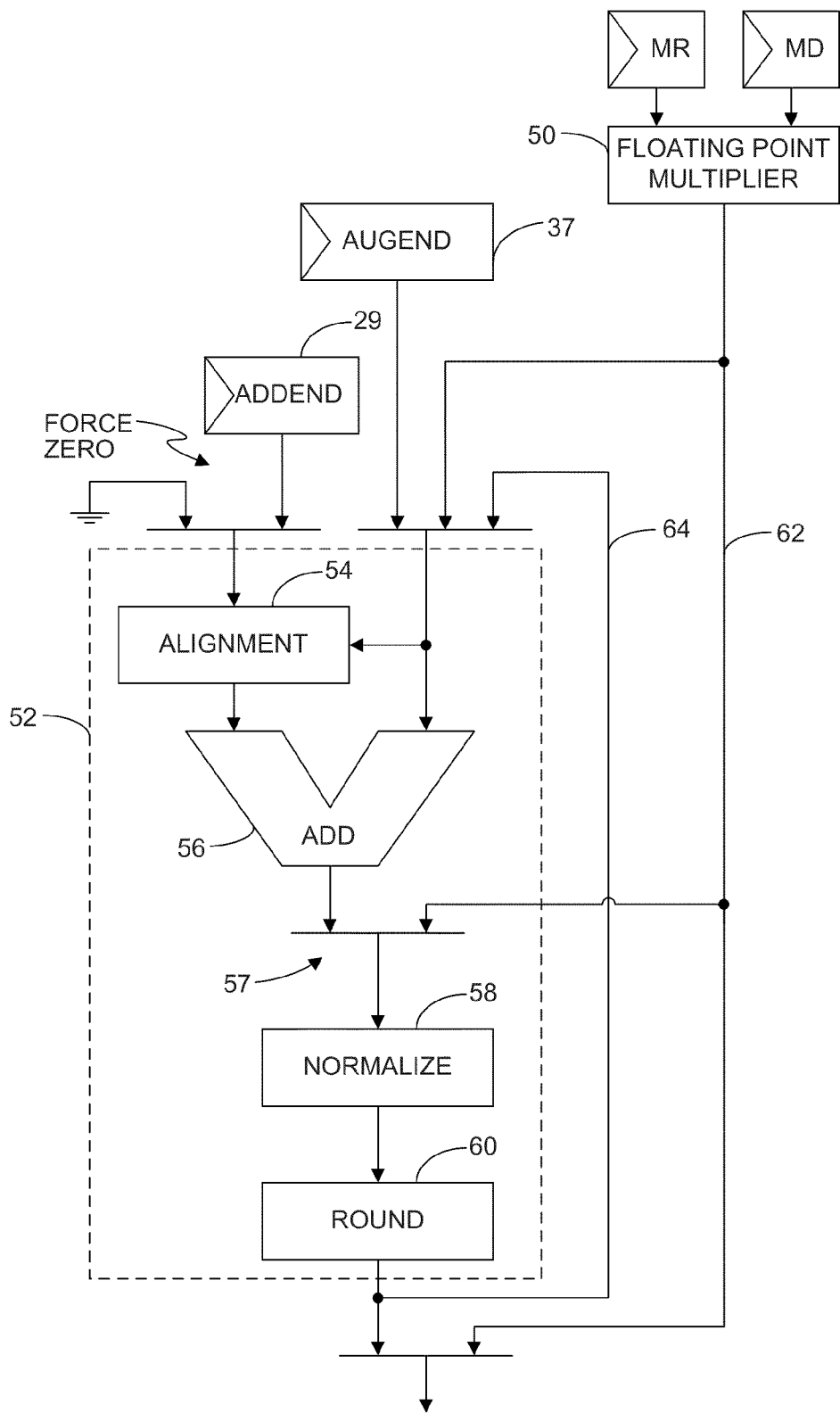
FIG. 2 is a functional block diagram of a floating-point adder fed by a floating-point multiplier.

In one embodiment, each floating-point multiply instruction is speculatively replaced with a fused multiply-add instruction with the addend forced to zero. This instruction stream alteration is commonly performed early in the relevant pipeline 12a, 12b, such as in a Decode stage, or in any event, prior to an Execute stage. By normal processor operation, in the Execute stage of the fused multiply-add, the output of a floating-point multiplier will be directed to the input of a floating-point adder, as depicted in FIG. 2. A floating-point adder that supports a fused multiply-add instruction has an input width sufficient to receive the intermediate product from a floating-point multiplier.

FIG. 2 is a functional block diagram depicting the output of a floating-point multiplier 50 directed to an input of a floating-point adder 52. The floating-point adder 52 includes an alignment circuit 54 for aligning floating-point addends, an add circuit 56 for calculating a floating-point sum, a normalization circuit 58 for normalizing (or denormalizing) the sum, and a rounding circuit 60 for rounding the shifted sum. The multiplier (MR) and multiplicand (MD) inputs to the multiplier 50, and the addend input(s) to the floating-point adder 52 may be registered values, such as those stored in the GPR file 28. Augand 37 multiplexes into floating-point adder 52 in order to utilize floating-point adder 52 in normal support mode.

To preserve the value of the output of the floating-point multiplier 50, while normalizing or denormalizing the number, the addend of the floating-point add operation is forced to zero. This may be implemented in numerous ways. For example, a value of zero may be multiplexed into the alignment circuit 54, as depicted in FIG. 2. Alternatively, the value zero may be stored to a GPR register 29, to be retrieved by the floating-point multiply-add instruction as part of normal execution. As yet another example, the output of a GPR register 29 may be gated with control logic that includes the denormal support mode bit, gating off the register value and presenting a zero in denormal support mode. In any event, the value zero is applied to the floating-point adder 52 as one addend, and the double-width output of the floating-point multiplier 50 is applied as the other addend. The addition to zero in the add circuit 56 does not alter the value of the number. The number is then normalized/denormalized in the normalization circuit 58, and rounded in the rounding circuit 60. In this manner, the processor 10 utilizes existing hardware in a floating-point adder 52 to accommodate unnormal outputs of a floating-point multiplier 50, and denormal final results.

In another embodiment, such as where the instruction set architecture supports only non-fused multiply-add operations, each floating-point multiply instruction is speculatively replaced with a non-fused multiply-add instruction. In this case, the intermediate full-width product should be routed to the adder normalization logic 58 without rounding. This can be achieved in a variety of ways. For example, the product may bypass the add circuit 56 and be routed directly into the normalization logic 58, as depicted at multiplexer 57. While not shown, the floating-point adder 52 may be implemented as a pipelined unit with intermediate registers. In such a case, the data routed to the normalization logic could also be pipelined to match. Alternatively, the floating-point adder input logic may be modified to accept the full width of the intermediate product. In either case, the add circuit 56 and the normalizer 58 are already wide enough for the data. Also, in the case of a non-fused multiply-add operation, a leading zero count should be performed on the upper half of the intermediate product. This count should be routed to the normalization logic for control and to the exponent logic for exponent generation (not shown).

Generally, the values of the multiplier (MR) and multiplicand (MD) are not known until deep in the pipeline, such as in an Execute stage. As a soon as the MR and MD values are known, they all are inspected to determine if they are both normal values and thus will generate a normalized significand from floating-point multiplier. In parallel, operations may be performed on the exponent values to determine if the final result will be normal. If the output of the floating-point multiplier 50 will be in a normal form and the final result will be a normal floating-point number the add operation may be suppressed. In this case, the output of the floating-point multiplier 50 may bypass the floating-point adder 52 by operand forwarding, as depicted in FIG. 2 by the path 62. This allows subsequent instructions, which are dependent on the result, to consume this data without waiting for it to pass through the adder. In some cases, such as when the result is barely denormal, it is difficult to determine early if the result will be denormal. In these cases, the add operation will be performed so that if the final product is denormal, it will be denormalized.

The floating-point multiplication operation of a multiply-add instruction may similarly generate a denormal or unnormal number as an intermediate product. In a denormal support mode, a non-fused multiply-add instruction is altered to add the value zero to the product of the multiply operation, and an add instruction is inserted into the instruction stream following the multiply-add instruction, with the addend of the original multiply-add instruction. That is, the full-width product of the floating-point multiply operation is added to zero prior to performing an add operation with the original addend. As discussed above with respect to multiply instructions converted to multiply-add instructions, the floating-point adder should be modified to accept the wider intermediate product, or this product should be directed to the normalizer. Also, a leading zero count should be maintained for significant bits of the product, which is used to control the normalize circuit. In this manner, the add operation of the multiply-add instruction is used to perform any normalization (or denormalization) of the product, without changing its value, prior to performing the addition operation via a separate floating-point add instruction. Logic that implements fused multiply-add instructions can handle the unnormal or denormal intermediate product without the necessity of inserting a subsequent add instruction.

As depicted in FIG. 2, the output of the floating-point multiplier 50 is directed to one input of the floating-point adder 52, and a zero is forced at the other input to the floating-point adder 52. The add circuit 56 does not alter the value of the intermediate product, which is normalized/denormalized in the normalization circuit 58 and rounded in the rounding circuit 60, as described above. The normalized (or denormalized) number is then routed to one input of the floating-point adder 52, as indicated by the path 64. The addend of the original multiply-add instruction, stored in GPR register 29, is directed to the other input of the floating-point adder 52, and the floating-point add instruction is executed. In this manner, outputs of the floating-point multiplier 50 are normalized/denormalized utilizing circuits in the floating-point adder 52, prior to performing the addition operation of the original non-fused multiply-add instruction.

Here again, the insertion of an add instruction into the instruction stream and the alteration of the multiply-add instruction to substitute a zero addend are commonly performed early in the pipeline, such as in a Decode stage. When the values of the multiplier (MR) and multiplicand (MD) become known, such as in an Execute stage, they may be inspected and the exponents operated on to determine whether the multiply operation could possibly generate an intermediate unnormal output, or if the final result will be denormal. If not, the alteration of the multiply-add instruction may be reversed, or "undone," by substituting the original addend for the addend of zero. Additionally, the floating-point add instruction that was inserted may be converted to a NOP (no operation), which may be removed by conventional pipeline optimization.

Figure 3:
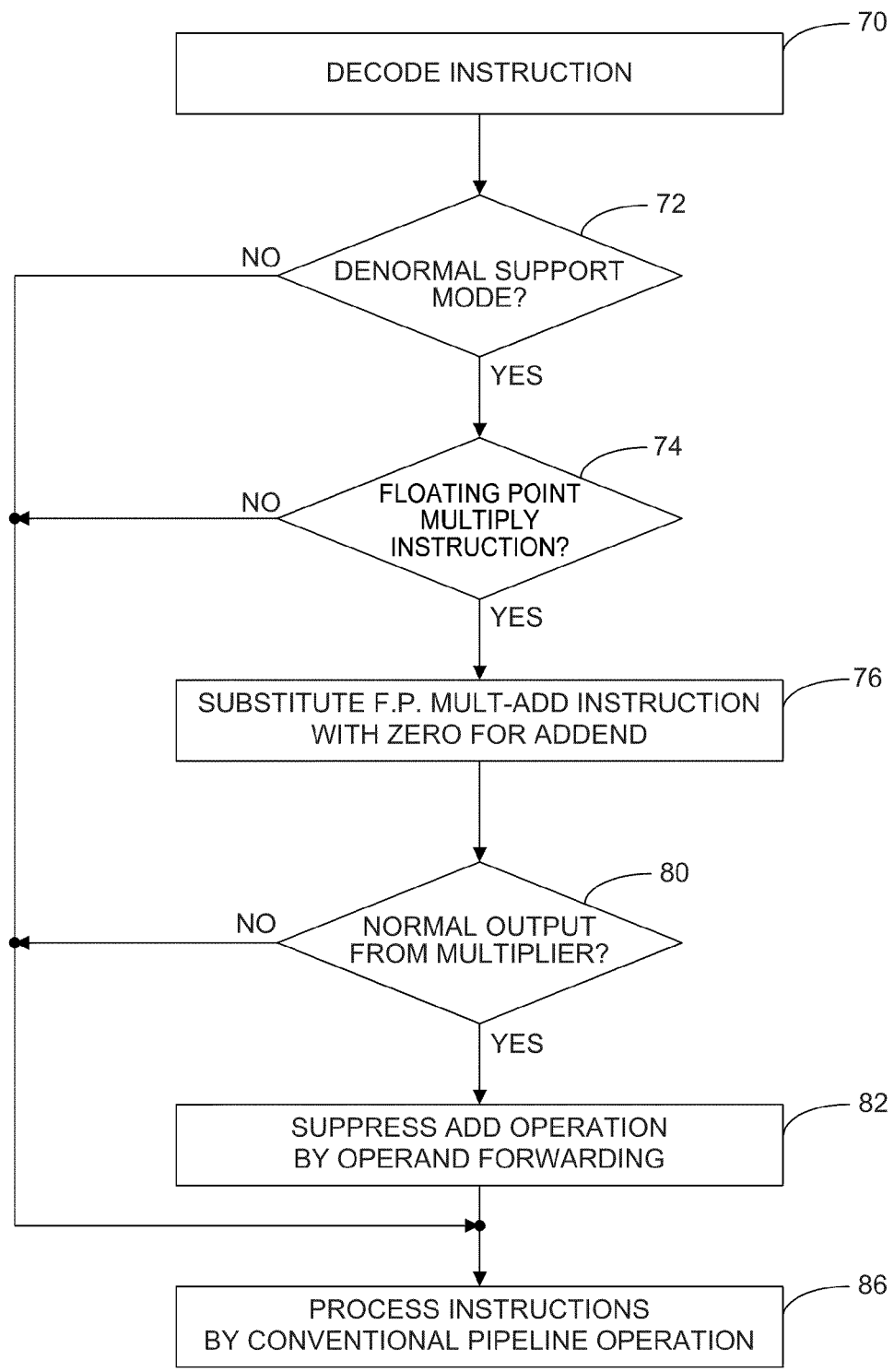
FIG. 3 is a flow diagram of a method of executing a floating-point multiply instruction.

FIG. 3 depicts operation of the processor 10 when processing floating-point multiply instructions in denormal support mode. An instruction is fetched (such as from the instruction cache 20) and decoded (block 70). If the processor is not operating in a denormal support mode (block 72), it processes instructions by conventional pipeline operation (block 86). If the processor is in denormal support mode (block 72), the decoded instruction is inspected to determine whether it is a floating-point multiply instruction (block 74). If not, the instruction is executed conventionally (block 86).

If the instruction is a floating-point multiply instruction, the processor 10 substitutes a floating-point multiply-add instruction with a zero addend for the floating-point multiply instruction (block 76). When the operands for the floating-point multiply operation are available, they are inspected to determine if the floating-point multiply operation is guaranteed to produce a normal output. If the floating-point multiply operation might produce an unnormal intermediate output or the final result might be denormal (block 80), the substituted multiply-add instruction is processed by conventional pipeline operation (block 86), normalizing or denormalizing the intermediate product using the normalization circuit 58 of the floating-point adder 52, as described above. In the case of a fused multiply-add instruction, no further control is necessary. In the case of a non-fused multiply-add instruction, while the adder circuit 56 is wide enough to handle the intermediate product, the floating-point adder 52 needs to be modified to properly route the bits to the adder. Alternatively, the intermediate product is routed directly, potentially including intervening state elements, to the normalize circuit 58 of the floating-point adder 52, as depicted in FIG. 2.

If it is determined that the floating-point multiply operation will produce normal intermediate and final results (block 80), the "add to zero" operation may be suppressed, such as by operand forwarding (block 82). This avoids the performance penalty of performing an "add to zero" operation where normalization/denormalization of the floating-point multiplier 50 output is not necessary.

Figure 4:
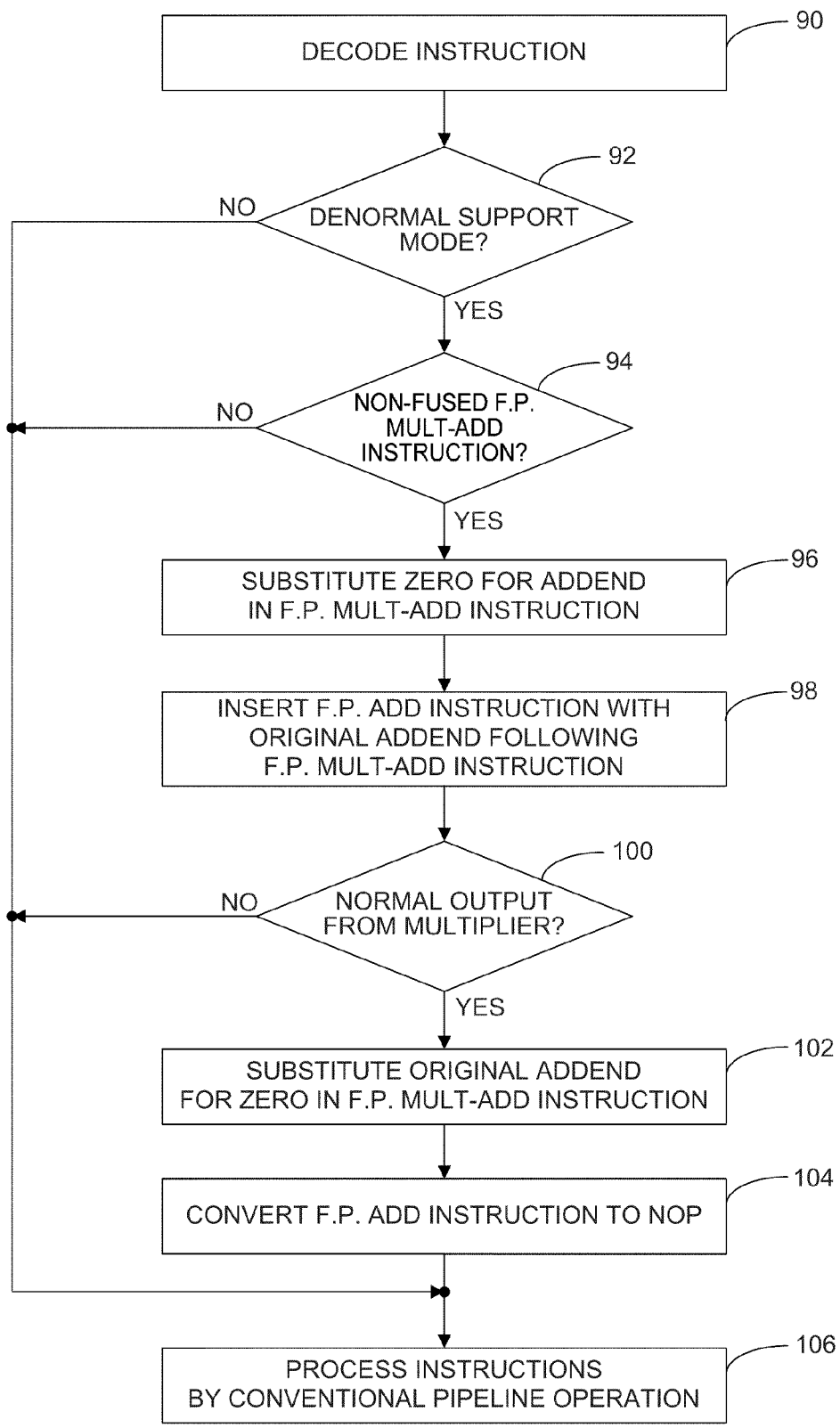
FIG. 4 is a flow diagram of a method of executing a floating-point multiply-add instruction.

FIG. 4 depicts operation of the processor 10 when processing floating-point multiply-add instructions in denormal support mode. An instruction is fetched (such as from the instruction cache 20) and decoded (block 90). If the processor is not operating in denormal support mode (block 92), it processes instructions by conventional pipeline operation (block 106). If the processor is in denormal support mode (block 92), the decoded instruction is inspected to determine whether it is a non-fused floating-point multiply-add instruction (block 94). If the instruction is not a floating-point multiply-add instruction or is a fused multiply-add instruction, the instruction is executed conventionally (block 106).

If the instruction is a non-fused floating-point multiply-add instruction (block 94), the processor normalizes/denormalizes intermediate products of the floating-point multiply operation prior to performing the floating-point add operation. First, the value zero is substituted for the addend in the floating-point multiply-add instruction (block 96). A floating-point add instruction with the original addend is then inserted into the instruction stream following the modified floating-point multiply-add instruction (block 98).

When the operands for the floating-point multiply operation are available, such as in an Execute stage, they are inspected to determine whether the floating-point multiply operation is guaranteed to produce normal intermediate and final results. If the floating-point multiply operation might produce an unnormal intermediate or a denormal final result (block 100), the modified multiply-add and additional add instructions are processed by conventional pipeline operation (block 106), normalizing/denormalizing the product using the normalization circuit 58 of the floating-point adder 52, prior to performing the floating-point add operation, as described above.

If it is determined that the floating-point multiply operation will produce a normal intermediate and final product (block 100), the product normalization is suppressed. The original addend is substituted for zero in the floating-point multiply-add instruction (block 102), and the additional floating-point add operation is suppressed by converting the floating-point add instruction to a NOP (block 104). Instruction processing then continues by conventional pipeline operation (block 86).

According to one or more embodiments, intermediate unnormal outputs of floating-point multiply operations and denormal final results are normalized/denornmalized utilizing normalization circuits 58 in a floating-point adder 52. This obviates the need to add normalization circuits to the output of the floating-point multiplier 50, which would add latency and delay, increase silicon area, and increase power consumption.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the disclosure. The present embodiments are therefore to be construed in all aspects as illustrative and not restrictive and all changes coming within the meaning and equivalency range of the appended claims are intended to be embraced therein.

What is claimed is:

1. A method of executing a nonfused floating-point multiply-add instruction in a processor to account for one or more of a plurality of denormal inputs and a denormal product comprising:
    performing, in a control logic of the processor:
        substituting a value zero for an original addend of the floating-point multiply-add instruction,
        inserting after the floating-point multiply-add instruction a floating-point add instruction having the original addend of the floating-point multiply-add instruction,
        inspecting a multiplier and a multiplicand of the floating-point multiply-add instruction,
        making a first determination, based on the inspecting, that the product of the multiply operation will not be a denormal number,
        making a second determination, based on the inspecting, that none of the inputs to the multiply operation are denormal numbers, and
        in response to the first and second determination, replacing the zero addend with the original addend of the multiply-add instruction, and converting the floating-point add instruction to a no operation (NOP); and
    performing the floating-point multiply-add instruction in a floating-point multiplier and a floating-point adder of the processor.

2. A processor comprising:
    one or more instruction execution pipelines;
    a floating-point multiplier;
    a floating-point adder including a normalization circuit;
    a pipeline controller operative to normalize or denormalize a floating-point product output by the floating-point multiplier using the normalization circuit of the floating-point adder;
        wherein the pipeline controller normalizes or denormalizes the denormal floating-point product by:
            directing the pipeline to convert each non-fused floating-point multiply-add instruction to a floating-point multiply-add instruction with an addend of zero;
            inserting after the floating-point multiply-add instruction a floating-point add instruction having the addend of the original floating-point multiply-add instruction; and
        wherein the pipeline controller is further operative to predict whether the floating-point multiplier is able to produce an unnormal intermediate product or denormal final product by inspection of a multiplier and a multiplicand prior to performing a floating-point multiply operation, and if not, suppressing normalization of the output of the floating-point multiplier by replacing the zero addend with the original addend of the multiply-add instruction, and converting the floating-point add instruction to a no operation (NOP).

* * * * *